(No Model.)
G. A. GERMOND.
PAN LIFTER.
No. 360,218. Patented Mar. 29, 1887.
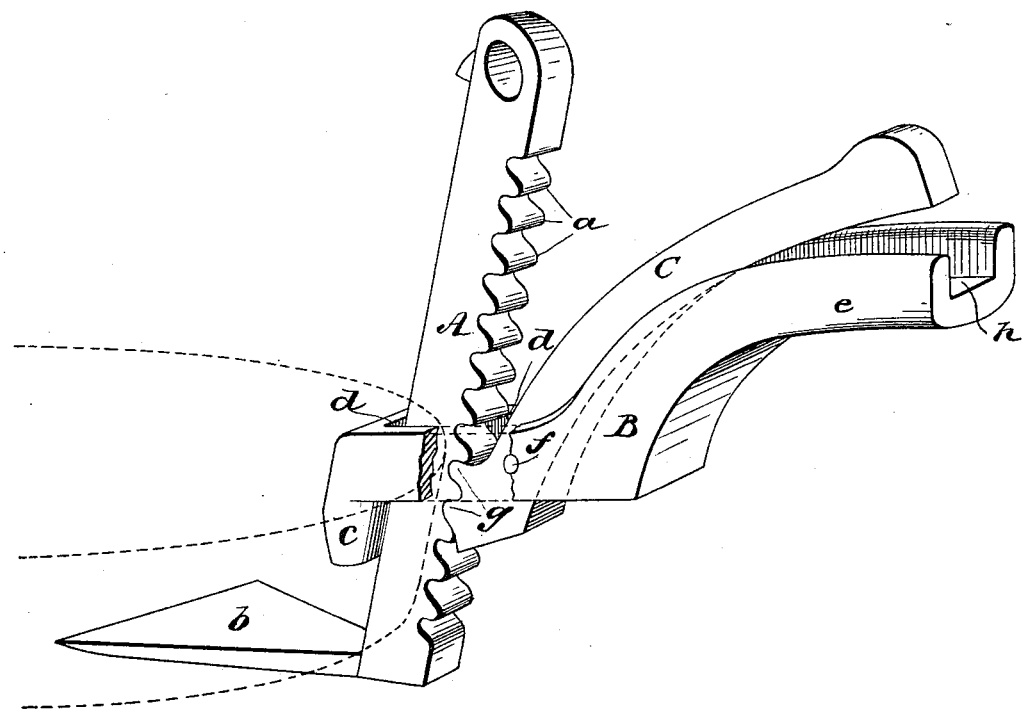
WITNESSES:
INVENTOR:
G. A. Germond
BY Munn & Co
ATTORNEYS.

UNITED STATES PATENT OFFICE.

GILBERT A. GERMOND, OF VAN NEST, WESTCHESTER COUNTY, NEW YORK.

PAN-LIFTER.

SPECIFICATION forming part of Letters Patent No. 360,218, dated March 29, 1887.

Application filed January 3, 1887. Serial No. 223,187. (No model.)

*To all whom it may concern:*

Be it known that I, GILBERT A. GERMOND, of Van Nest, in the county of Westchester and State of New York, have invented a new and Improved Pan-Lifter, of which the following is a full, clear, and exact description.

The object of my invention is to provide a cheap and convenient device for lifting pans and other flanged objects; and to this end my invention consists of a pan-lifter constructed substantially as hereinafter described and claimed.

Reference is to be had to the accompanying drawings, forming a part of this specification, in which the figure is a broken perspective view of my new and improved pan-lifter, showing a pan in dotted lines.

The lifter is composed of three parts, the standard A, grasping-lever B, and the binding-lever C. The standard A is notched or serrated at its rear edge, as shown at $a$, and is formed with the foot $b$ at its lower end. The grasping-lever is formed with the hook $c$ at its forward end, and is mortised at $d$ to pass freely over the standard A, and also to receive the binding-lever C, and is extended to form the handle $e$. The lever C is curved and pivoted in the mortise $d$ upon the pin $f$, and its lower end is formed to engage with the teeth of the standard A, preferably with two teeth, $g$, as shown clearly in the figure. In the upper end of the lever C is lifted from the lever B, and the two raised upon the standard to clear the hook $c$ from the edge of the pan to be lifted. The foot $b$ is then shoved under the bottom of the pan, the levers B C lowered until the hook $c$ is fairly over the edge of the pan. Then the handle portions of the levers B C are grasped and closed together, which first draws the hook $c$ against the edge of the pan and grasps it between said hook and the front edge of the standard, and then the lower end of the lever C engages with the teeth of the standard, and thus firmly locks the device to the pan, so that it can be conveniently lifted and carried by the handles of the levers B C.

By constructing the device as described it is not only cheap and convenient, but is adapted to be applied to any pan, whether it have a wide or narrow flange or rim.

The upper surface of the grasping-lever B is, by preference, channeled, as shown at $h$, to receive the lever C when the two levers are closed together, as will be understood from the drawing.

Having thus described my invention, what I claim as new, and desire to secure by Letters Patent, is—

1. The pan-lifter herein shown and described, comprising a footed standard notched at the back, the hooked lever B, placed upon the standard, and the lever C, pivoted in the lever B and adapted to engage with the back of the standard, substantially as described.

2. The standard A, formed with a foot, $b$, in combination with the mortised and hooked lever B, and the hooked or notched lever C, pivoted in the lever B, to engage with the back of the standard, substantially as described.

GILBERT A. GERMOND.

Witnesses:
C. SEDGWICK,
E. M. CLARK.